United States Patent [19]

Takei et al.

[11] Patent Number: 5,137,128
[45] Date of Patent: Aug. 11, 1992

[54] MAGNETIC PARTICLE TYPE ELECTROMAGNETIC CLUTCH WITH TORQUE DETECTOR

[75] Inventors: Hideaki Takei; Tsuguyasu Mizoue; Yoshiharu Kobayashi; Ryosuke Okita; Masaya Yamada, all of Himeji, Japan

[73] Assignee: Mitsubishi Denki K.K., Tokyo, Japan

[21] Appl. No.: 717,570

[22] Filed: Jun. 19, 1991

[30] Foreign Application Priority Data

Jun. 20, 1990 [JP] Japan .................. 2-65662[U]
Jun. 22, 1990 [JP] Japan .................. 2-66480[U]
Jul. 2, 1990 [JP] Japan .................. 2-177025
Jul. 10, 1990 [JP] Japan .................. 2-180427

[51] Int. Cl.⁵ .................. F16D 37/02; G01L 5/00
[52] U.S. Cl. .................. 192/21.5
[58] Field of Search .................. 192/21.5; 73/862.36

[56] References Cited

U.S. PATENT DOCUMENTS

| | | | |
|---|---|---|---|
| 2,885,045 | 5/1959 | Barrett .................. | 192/21.5 |
| 4,520,680 | 6/1985 | Tatsumi .................. | 73/862.36 X |
| 4,760,745 | 8/1988 | Garshelis .................. | 73/862.36 |
| 4,811,823 | 3/1989 | Raymond et al. .................. | 192/21.5 |
| 4,887,461 | 12/1989 | Sugimoto et al. .................. | 73/862.36 X |
| 4,986,137 | 1/1991 | Sato et al. .................. | 73/862.36 |
| 5,036,713 | 8/1991 | Ikeda et al. .................. | 73/862.36 |

FOREIGN PATENT DOCUMENTS 0245033 10/1986 Japan .................. 73/862.36

OTHER PUBLICATIONS

*IEEE Transactions on Magnetics*, vol. MAG-20, No. 5, Sep. 1984, pp. 951-953, "Torque Transducers with Stress-Sensitive Amorphous Ribbons of Chevron-Pattern" Sasada et al., 73/862.36.

Primary Examiner—Rodney H. Bonck
Attorney, Agent, or Firm—Sughrue, Mion, Zinn Macpeak & Seas

[57] ABSTRACT

A magnetic particle type electromagnetic clutch has two clutch discs so disposed that the two discs can be electromagnetically connected together and disconnected. In a space between the two discs are charged magnetic particles. When an excitation current is run through the excitation coil disposed near the two discs to produce a magnetic flux, the two discs and magnetic particles are magnetized to be connected in unison, thereby transmitting a torque from the drive shaft to the driven shaft. The two discs are each secured to the tip end of the shafts. The shaft has two groups of magnetic layers which are rigidly affixed to the shaft and axially spaced. Each of the groups of magnetic layers is directed +45 degrees or −45 degrees with respect to the axis of the shaft. When the shafts start to rotate, magnetostriction is developed in the respective magnetic layers resulting in a change in permeability. The change in permeability is causes the change in impedance of a first and second detecting coils so disposed that they face the magnetic layers. The change in impedance is electrical representation of the torque applied to the shafts.

6 Claims, 6 Drawing Sheets

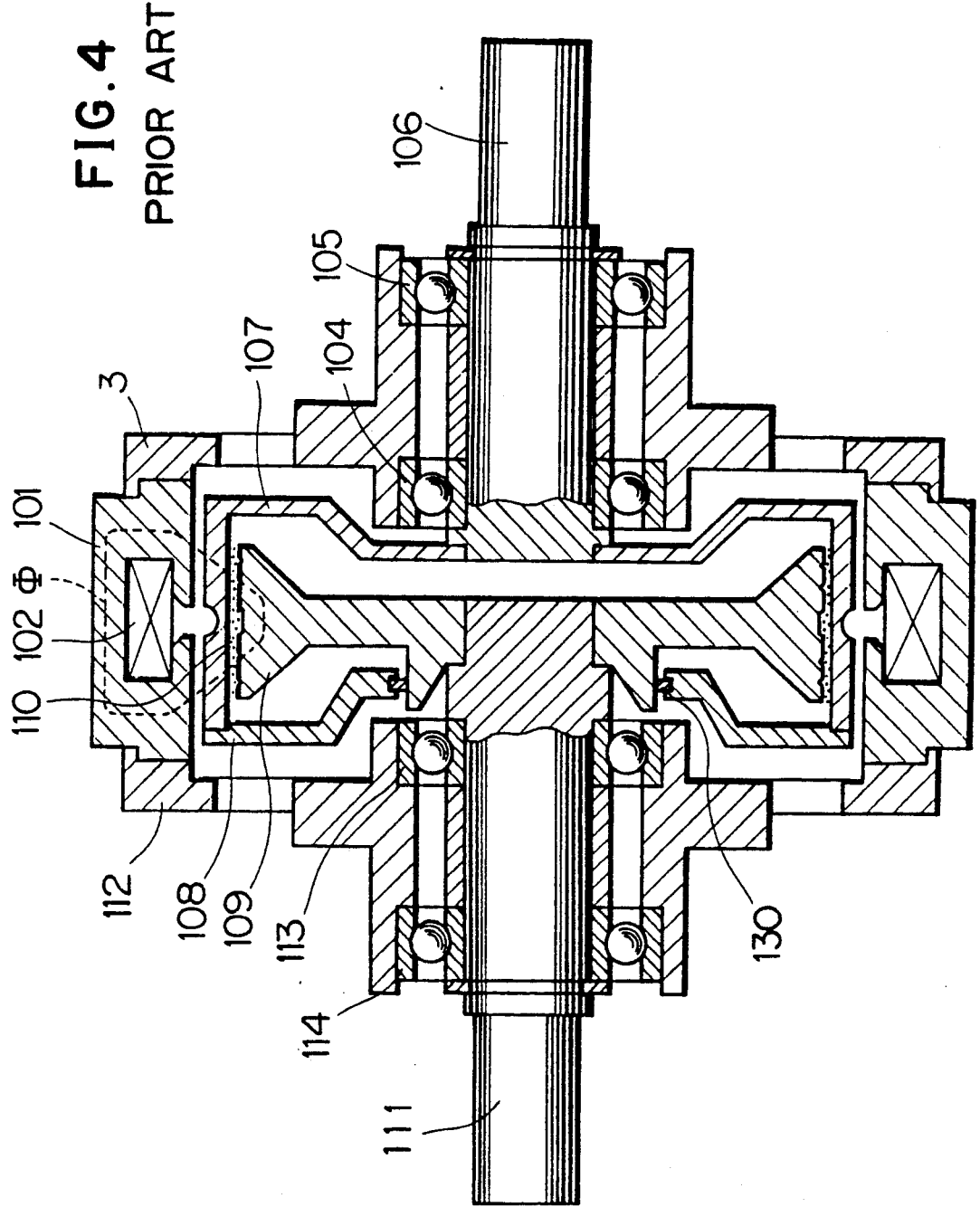

MAGNETIC PARTICLE TYPE ELECTROMAGNETIC CLUTCH WITH TORQUE DETECTOR

BACKGROUND OF THE INVENTION

1. Field of the Invention

The present invention relates to a magnetic particle type electromagnetic clutch.

2. Prior Art

FIG. 4 shows a cross-sectional view of a prior art magnetic particle type electromagnetic clutch. A drive shaft 106 is driven into rotation by a drive source (not shown) so that a drive element 107 mounted on the shaft rotates in a unitary motion with the shaft 106. When an excitation current is run through an excitation coil 102 housed in a stator 101, a magnetic flux Φ is generated as shown in FIG. 4. With the aid of the magnetic flux Φ, magnetic particles 110 forming part of the magnetic path are magnetized to make up a chain-like connection between a driven element 109 and the rotating drive element 107 so that the two elements 107 and 109 attracts each other to become together. Thus, a drive force is transmitted to the driven element 109 so as to drive the driven shaft 111 into rotation. When the current through the excitation coil is shut off, the magnetic flux is diminished so that the magnetic particles 110 are free from chain-like connection leaving the driven element 109 free from the drive element 107. The torque transmitted from the drive element 107 to the driven element 109 is substantially proportional to an amount of current through the excitation coil 102; the torque is controlled at will by varying the current. Therefore, the variation in manufacture of the clutch and the deterioration of magnetic particles with age adversely affect current-to-torque characteristics resulting in insufficient torque control. For sufficient torque control, a torque detector is required in addition to the above-described magnetic particle type electromagnetic clutch, resulting in a complex and expensive clutch construction.

FIG. 5 shows a film winding device where such an electromagnetic clutch is used. In the figure, the drive force of a motor 115 is transmitted via a magnetic particle type electromagnetic clutch 116 to a driven shaft 111. The rotation of driven shaft 111 is transmitted to a takeup shaft 120 via a belt 119 to wind up a film 121. Rollers 126 and 127 give a tension to a tension-detecting roller 125. The tension detectors 123 and 124 detect the tension of the film 121 via the tension-detecting roller 125. The outputs of tension detectors 123 and 124 are supplied to a controller 128 which controls the current being supplied to the electromagnetic clutch 116. This kind of construction requires the independent tension detectors 123 and 124 and the rollers 122, 126, and 127 for giving a tension as well as the overall construction is complicated and expensive. In addition, a space for mounting the tension detectors is often not available.

SUMMARY OF THE INVENTION

An object of the invention is to provide a magnetic particle type electromagnetic clutch in which a torque transmitted can easily be detected and controlled.

An object of the invention is to provide a magnetic particle type electromagnetic clutch in which stable torque detection is effected with high accuracies.

An object of the invention is to provide a magnetic particle type electromagnetic clutch in which the magnetostriction of layers of magnetic material due to temperature rise is compensated so that the torque measurement is effected with high accuracies.

An object of the invention is to provide a magnetic particle electromagnetic clutch in which the magnetic flux produced by the excitation coil is redirected such that the leakage flux does not adversely affect the accuracy of torque detection.

A magnetic particle type electromagnetic clutch has two clutch discs so disposed that the two discs can be electromagnetically connected together and disconnected. In a space between the two discs are charged magnetic particles. When an excitation current is run through the excitation coil disposed near the two discs to produce a magnetic flux, the two discs and magnetic particles are magnetized to be connected in unison, thereby transmitting a torque from the drive shaft to the driven shaft. The two discs are each secured to the tip end of the shafts, which has two groups of magnetic layers rigidly affixed to the shaft and axially spaced from each other. Each of the groups of magnetic layers is directed +45 degrees or −45 degrees with respect to the axis of the shaft. When the shafts starts to rotate, magnetostriction is developed in the respective magnetic layers resulting in a change in permeability. The change in permeability is causes the change in impedance of a first and second detecting coils so disposed that they face the magnetic layers in the bracket. The change in impedance is electrical representation of the torque applied to the shafts.

BRIEF DESCRIPTION OF THE DRAWINGS

Features and other objects of the invention will be more apparent from the description of preferred embodiments with reference to the accompanying drawings in which:

FIG. 4 shows a prior art magnetic particle type electromagnetic clutch; and

DESCRIPTION OF THE PREFERRED EMBODIMENTS

Figure 1:
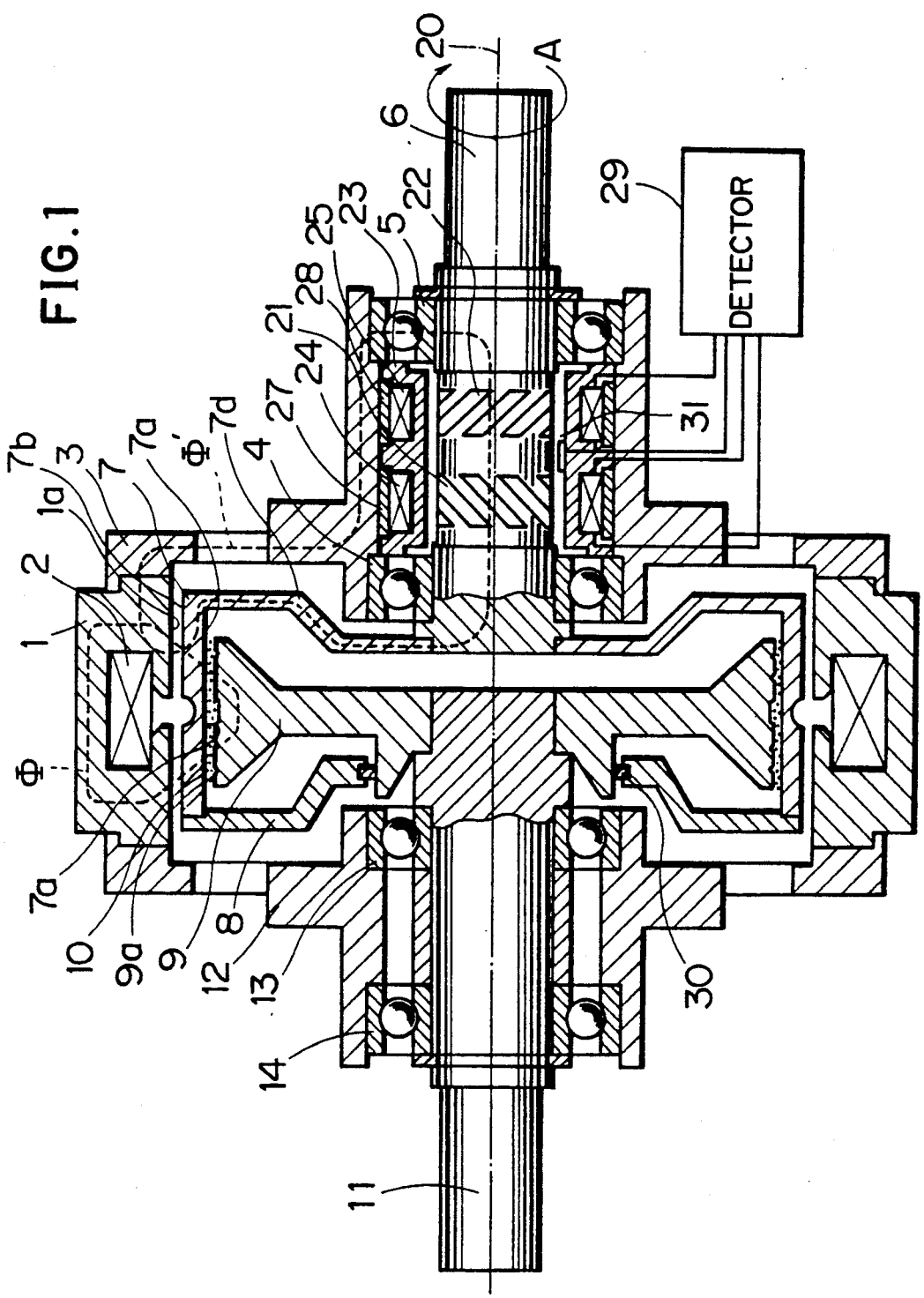
FIG. 1 is a cross-sectional view of a magnetic particle type electromagnetic clutch according to the present invention.
Figure 2:
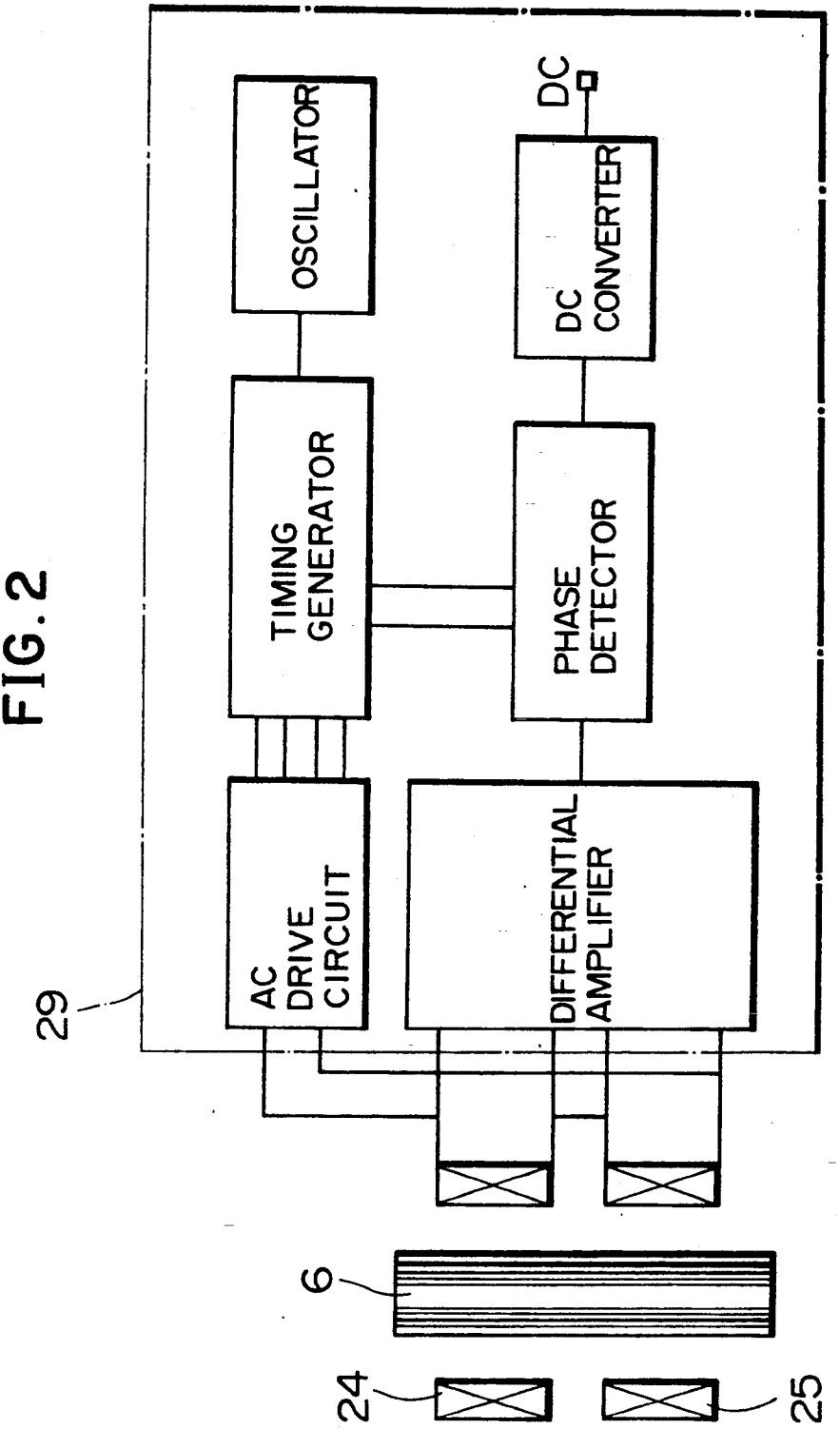
FIG. 2 is a well known tension detector used with the magnetic particle type electromagnetic clutch according to the present invention.

An embodiment of the invention will now be described in detail with reference to the drawings. FIG. 1 shows a cross-sectional view of a magnetic particle type electromagnetic clutch according to the invention. A bracket 3 supports a stator 1 made of ferromagnetic material. The bracket 3 also rotatably supports a drive shaft 6 made of carbon steel by means of bearings 4 and 5. The driven shaft 11 is directly in line with the drive shaft 6 and is rotatably supported by the bracket 12 by means of the bearings 13 and 14. The drive shaft 6 has a drive disc 7 secured to the distal end thereof while the driven shaft 11 has a drive disc 9 secured to the tip end thereof. The drive disc 7 includes a drum having an outer circumferential surface 7b spacedly embraced by the inner wall of the stator 1. An inner circumferential surface 7a of the drum of drive disc 7 spacedly embraces a circumferential surface 9a of a driven disc 9 with particles 10 charged between the surface 7a and surface 9a. A plate 8 is secured to the end of the drum of drive disc 7 and loosely fits via a seal 30 to the driven disc 9 near the driven shaft 11. The seal 30 serves to prevent the possible invasion of the magnetic particles 10 into the ball bearings 13 and 14. When an excitation current flows through the excitation coil 2 in the stator 1, the particles 10 are magnetized. A magnetic layers 21 and 22 of soft magnetic material having high permeability are affixed to the outer circumference of the drive shaft 6 such that the layer 21 is directed at +45 degrees with respect to the axis of shaft 6 and the layer 22 at −45 degrees. A coil bobbin 23 around which detecting coils 24 and 25 are separately wound, is housed in the bracket 3. The detecting coils 24 and 25 are connected with an external detecting circuit 29. FIG. 2 is a block diagram of the detecting circuit 29, which is a well known inductance differential amplifier and the description thereof is omitted.

The operation of the embodiment of the above-described construction will now be described. When an excitation current is run in the excitation coil 2, the excitation coil 2 generates a magnetic flux $\Phi$ by which the magnetic particles 10 are magnetized. The magnetized particles 10 are then coupled each other in a chain-like fashion between the drive disc 7 and driven disc 9 to mechanically connect the two discs together, so that a drive force is transmitted from the drive shaft 6 to the driven shaft 11. When a torque or drive force is exerted to the drive shaft 6 in the direction of the arrow A in FIG. 1, a tensile force is exerted to each of the magnetic layers 21 and a compressive force to each of the magnetic layers 22 so that magnetostriction is developed within the magnetic layers 21 and 22, respectively. The magnetostriction results in changes in permeability of the magnetic layers 21 and 22. The change in permeability differs in polarity whether the exerted force is tensile or compressive. The detecting coils 24 and 25 detect changes in permeability of these magnetic layers in terms of changes in impedance of the respective detecting coils. The change in impedance is amplified by a differential amplifier which in turn outputs a voltage indicative of a torque in accordance with the magnetostriction of the drive shaft 6.

Figure 5:
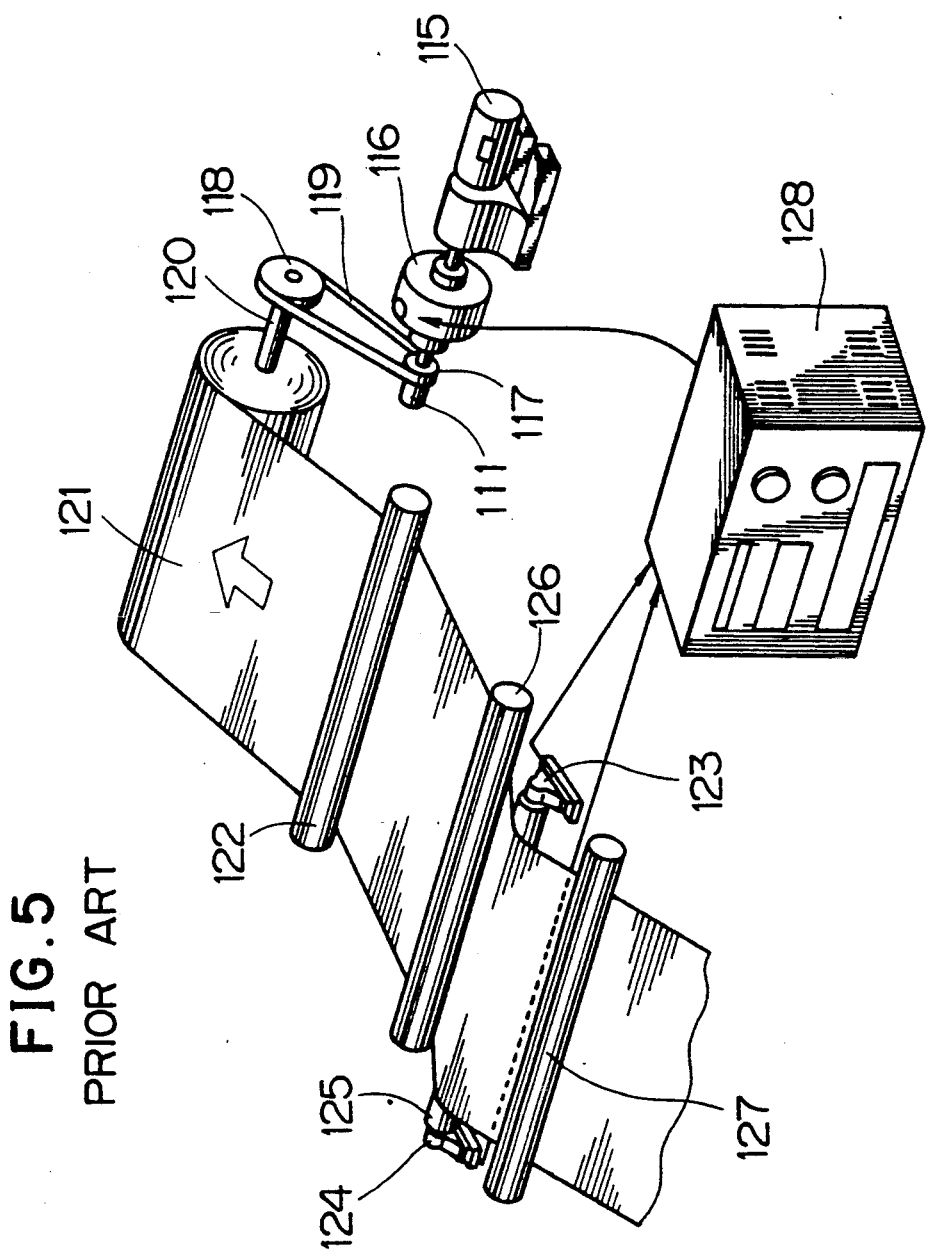
FIG. 5 shows a film winding device in which the clutch shown in FIG. 4 is used.

The bearings 4 and 5 are spaced apart from each other on the drive shaft 6 so as to rotatably support the drive shaft 6 and ensure long bearing life. The magnetic layers 21 and 22 are provided in a space available between the bearings 4 and 5, being effective to ensure a small clutch size. The use of a magnetic particle type electromagnetic clutch according to the invention facilitates torque control for the film-winding device without the tension detectors 123 and 124 in FIG. 5, which is otherwise required.

If the drive shaft 6 is made of carbon steel, the flux $\Phi 2$ produced by the excitation coil 2 passes through the drive shaft 6, resulting in shifts in the magnetic operating points of the magnetic layers 21 and 22 which in turn causes an error in torque measurement. The drive shaft 6 in FIG. 1 may be made of Hastelloy, a non-magnetic Ni-based super alloy. Then, the magnetic flux produced by the excitation coil 2 will not reach the magnetic layers 21 and 22 via the drive shaft 6 to adversely affect the magnetic layers 21. The thermal expansion coefficient of the drive shaft made of the Ni-based super alloy is in the range of $10 \times 10^{-6}$ to $12 \times 10^{-6}$, substantially equal to that of the magnetic layers 21 and 22 made of amorphous material. Thus, there is no significant difference in thermal expansion coefficient between the drive shaft 6 and the magnetic layers 21 and 22. Thus, no unwanted mechanical stress is developed between the drive shaft and the magnetic layers due to temperature change.

The clutch may be provided with a temperature sensor 31 as shown in FIG. 1. The temperature sensor 31 is fixed on the inner circumferential surface of the coil bobbin 23 and between the magnetic layers 21 and 22 so as to detect the temperature of the magnetic layers 21 and 22. The output of the temperature sensor 31 is inputted to the detector 29. The detector 29 also receives the output of the detecting coils 24 and 25 so as to compensate for the temperature dependency of the characteristics of the magnetic layers 21 and 22 in accordance with the output of the temperature sensor 31. Thus, the errors in measurement of magnetostriction due to the temperature rise of magnetic layers can be prevented. If the temperature distribution of the magnetic layers, excitation coil 2, magnetic particles 10, and ball bearings 4, 5, 13, and 14 are measured previously, the temperatures of the excitation coil 2, ball bearings etc. may be readily determined so that the sensor 31 may serve as an alarm for avoiding the burn-out of excitation coil 2, seizure of magnetic particles 10, and bearing lock of the ball bearings 4, 5, 13, and 14.

Figure 3A:
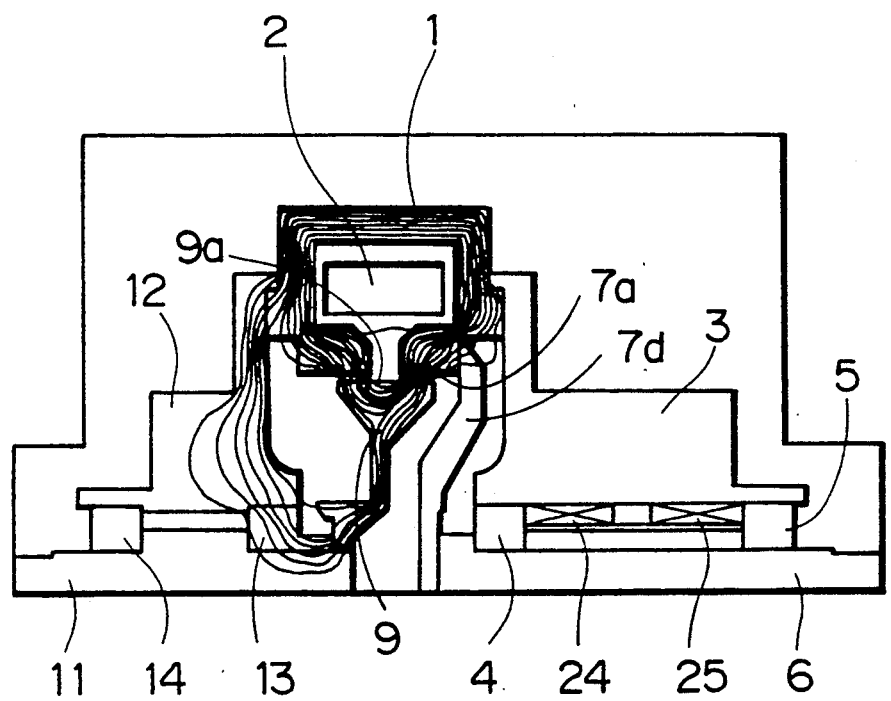
FIG. 3A illustrates a magnetic path of the flux produced by the excitation coil in FIG. 1 where only the drum of the drive disc is made of non-magnetic material except for a portion magnetically coupled to the driven disc.
Figure 3B:
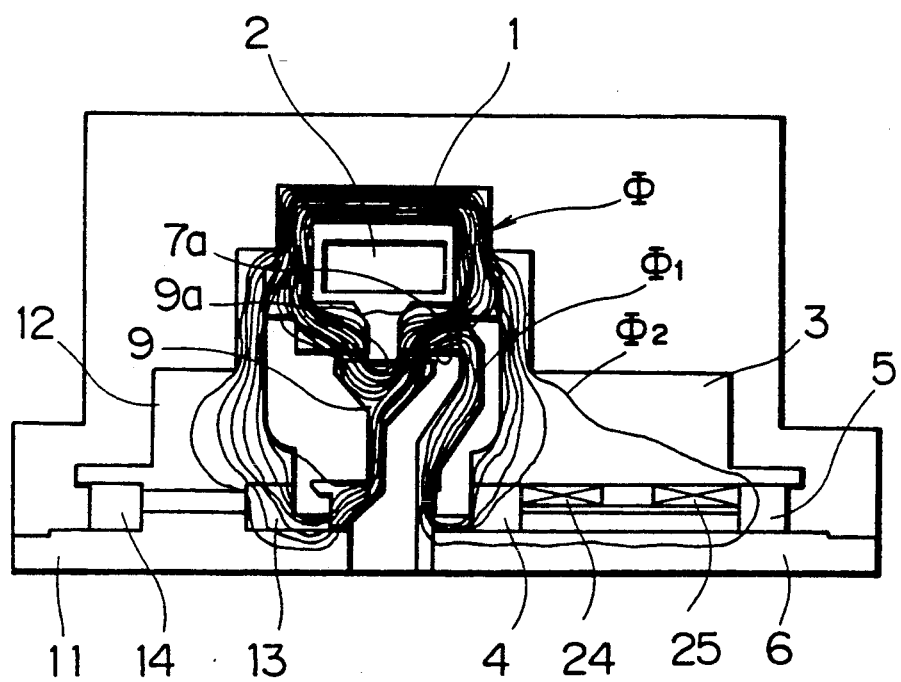
FIG. 3B shows a magnetic path when the entire drive disc is made of magnetic material.

With the clutch in FIG. 1, part of the flux $\Phi$ produced by the excitation coil 2 passes as leakage fluxes $\Phi 1$ and $\Phi 2$ into the bracket 3 and the drive shaft 6 as shown in FIG. 3B, so that the output of detecting coils 24 and 25 may be adversely affected. As shown in FIG. 3A, the bracket 3 may be made of a non-magnetic material and the drive disc 7 may have a plate 7d of non-magnetic material connected to the drive shaft 6. By this construction, most of the flux $\Phi$ passes through a loop of the stator 1, surfaces 7a and 7b of drive disc 7, surface 9a of the driven disc 9, and stator 1. The leakage fluxes $\Phi 1$ and $\Phi 2$ will not pass through the bracket 3 and the plate 7c because they are made of non-magnetic materials. Thus, the amount of leakage flux is reduced greatly, so that the change in impedance of the detecting coils 24 and 25 is not adversely affected by the leakage flux, ensuring torque detection with high accuracies.

The magnetic layers 21 and 22 and the detecting coils 24 and 25 may be provided on the driven shaft 11 in stead of the shaft 6 for the same effect or one of the magnetic layers and one of the detecting coils 24 an 25 may be provided on the drive shaft 6 and the others on the driven shaft 11. While the embodiment has been described with respect to the detection of torque based on the magnetostriction method, the torque may be detected by the phase difference method or strain gauge method. The invention may be applied not only to a clutch but also to a brake, in which case the driven shaft is be fixed.

What is claimed is:

1. A magnetic particle type electromagnetic clutch comprising:
    a first rotor made of a magnetic material and securely mounted to a first shaft;
    a second rotor made of a magnetic material and securely mounted to a second shaft, said second rotor being so disposed as to be electromagnetically connected to said first rotor;

magnetic particles charged into a space between said first rotor and said second rotor;

an excitation coil for magnetizing said first and second rotors and said magnetic particles to connect them together so that a torque is transmitted between said first and second rotors;

at least one first magnetic layer mounted on said shafts and directed at a positive angle with respect to an axis thereof;

at least one second magnetic layer mounted on said shafts and directed at a negative angle with respect to said axis, said second magnetic layer being axially spaced from said first magnetic layer; and first and second detecting coils mounted to a bracket and disposed such that each of said detecting coils faces each of said first and second magnetic layers, said first and second shafts being made of non-magnetic material and having substantially the same thermal expansion coefficient as said at least one first and second magnetic layers.

2. A magnetic particle type electromagnetic clutch according to claim 1, wherein said first magnetic layer is directed +45 degrees with respect to said axis and said second magnetic layer is directed −45 degrees with respect to said axis.

3. A magnetic particle type electromagnetic clutch comprising:

a first rotatable coupling portion made of a magnetic material;

a second rotatable coupling portion made of a magnetic material, said second coupling portion being so disposed as to be electromagnetically coupled to said first rotatable coupling portion;

magnetic particles charged into a space between said first and second coupling portion;

an excitation coil for magnetizing said magnetic particles and said first and second coupling portions to connect them together so that a torque is transmitted between said first and second coupling portions;

a torque detector for detecting said torque;

rotating shafts on which said coupling portions are mounted; and brackets interposed between said coupling portions for respectively rotatably supporting said shafts, wherein said torque detector includes magnetic layers mounted on an outer surface of at least one of said shafts and a detecting coil mounted to a corresponding one of said brackets such that said detecting coil opposes said magnetic layers, and wherein at least one of said brackets is made of a non-magnetic material.

4. A magnetic particle type electromagnetic clutch according to claim 3, wherein said detecting coil includes a first detecting coil and a second detecting coil, and said magnetic layers include first magnetic layers directed +45 degrees with respect to an axis of said shafts and second magnetic layers directed −45 degrees with respect to an axis of said shafts, and said first and second detecting coils being so disposed that each of said first and second detecting coils faces each of said first and second magnetic layers.

5. A magnetic particle type electromagnetic clutch according to claims 1 or 3, wherein said shafts are made of Ni-based super alloy and said magnetic layers are made of an amorphous material.

6. A magnetic particle type electromagnetic clutch according to claims 1 or 3, wherein said clutch includes a temperature sensor so mounted near said magnetic layers as to output a signal indicative of a temperature of said magnetic layers.

* * * * *